US007178894B2

(12) United States Patent
Lodge

(10) Patent No.: US 7,178,894 B2
(45) Date of Patent: Feb. 20, 2007

(54) FRANKING DEVICE WITH TAMPER PROTECTION

(75) Inventor: Graham Roderick Lodge, Needingworth (GB)

(73) Assignee: Francotyp-Postalia AG & Co. KG, Birkenwerder (DE)

( * ) Notice: Subject to any disclaimer, the term of this patent is extended or adjusted under 35 U.S.C. 154(b) by 1034 days.

(21) Appl. No.: 10/074,755

(22) Filed: Feb. 13, 2002

(65) Prior Publication Data

US 2002/0135809 A1 Sep. 26, 2002

(30) Foreign Application Priority Data

Mar. 21, 2001 (DE) ................................ 101 14 535

(51) Int. Cl.
*B41J 29/38* (2006.01)
*G06F 17/00* (2006.01)

(52) U.S. Cl. ........................................ 347/16; 705/401

(58) Field of Classification Search .................. 347/16; 705/401

See application file for complete search history.

(56) References Cited

U.S. PATENT DOCUMENTS 5,762,428 A 6/1998 Cordery et al.
5,800,082 A * 9/1998 Yamasawa ............. 400/120.14

FOREIGN PATENT DOCUMENTS

DE OS 32 13 646 10/1983
EP 0 702 335 3/1996
EP 0 980 762 2/2000

* cited by examiner

*Primary Examiner*—Julian D. Huffman
(74) *Attorney, Agent, or Firm*—Schiff Hardin LLP

(57) ABSTRACT

In a method and apparatus for generating a print image, particularly a franking imprint, on a first image carrier composed of at least one first partial image and a second partial image offset thereto transversely relative to a first direction, whereby a relative motion between a print head and an image carrier is generated along a first direction in a first step for generating the first partial image. A transverse offset between the print head and the image carrier is generated in a second direction proceeding transversely to the first direction in a second step. A relative motion between the print head and the image carrier is generated along the first direction in a third step for generating the second partial image. The waiting time interval between the end of the printing event of the first step and the beginning of the printing event of the third step has a length that is varied according to a prescribed function to prevent tampering.

10 Claims, 3 Drawing Sheets

FRANKING DEVICE WITH TAMPER PROTECTION

BACKGROUND OF THE INVENTION

1. Field of the Invention

The present invention is directed to a method and apparatus for generating a print image, particularly a franking imprint, on an image carrier, of the type wherein the print image is composed of at least one first partial image and a second partial image that are transversely offset relative to a direction, wherein a relative motion between a print head and the image carrier is generated along a first direction in a first step for generating the first partial image, a transverse offset between the print head and the image carrier is generated in a second direction proceeding transverse to the first direction in a second step, and a relative motion between the print head and the image carrier is generated along the first direction in a third step for generating the second partial image.

2. Description of the Prior Art

A method and apparatus of the above type are disclosed, for example, in European Application 0 980 762, wherein the print head generates a franking imprint on a letter in two partial images offset transversely relative to one another, those partial images supplementing one another to form a complete franking imprint on the letter. The print head is first moved across the letter in a first direction and thereby generates the first partial image. Subsequently, it is offset transversely relative to this first direction by an offset device in the second set before it is moved over the letter in a direction opposite the first direction, whereby the second partial image is then generated on the letter.

It is especially important in postage meter machines, wherein a monetary imprint, namely for franking a letter or the like, is generated to reduce the possibilities for manipulation with fraudulent intent (temporary) to a minimum, or to even preclude tampering entirely.

One possibility for tampering in conjunction with the aforementioned known postage meter machine is to obtain access to the control data for the drive of the nozzles of the print head by fraudulent manipulations at the postage meter machine and to forward in parallel to a number of printer devices (referred to as a parallel attack) in order to simultaneously generate one and the same franking imprint at the different machines.

This particular security risk is significant for postage meter machines because the internal postage calculation ensues based on the generation of the control data, and, moreover, the region of the print head at which such sensitive data must ultimately arrive usually must be accessible at least for replacement, so that manipulations are easier to carry out at that location.

In known postage meter machines, tampering protection usually takes the form of making access to the control data more difficult, usually with mechanical impediments such as diaphragms, covers, etc. This, however, has the disadvantage that the design of the print head and the leads to the print head usually have a relatively complicated form as a result.

SUMMARY OF THE INVENTION

An object of the present invention is to provide a method and an apparatus of the type initially described wherein the risk of such tampering is reduced in a simple way.

The above object is achieved in accordance with the principles of the present invention in a method and an apparatus for generating a print image, particularly a franking imprint, on an image carrier composed of at least one first partial image and a second partial image transversely offset relative to a first direction, wherein a relative motion between a printhead and the image carrier is generated along the first direction in a first step for generating the first partial image, a transverse offset is generated between the printhead and the image carrier in a second direction, proceeding transversely to the first direction, in a second step, and a relative motion between the printhead and the image carrier is generated along the first direction in a third step for generating the second partial image, wherein a waiting time interval between the end of the printing in the first step and the beginning of the printing in the third step has a length that is varied according to a prescribed function.

The present invention is based on the recognition that the risk of a successful, so-called parallel attack, i.e. the production of a number of copies of the same franking imprint with different printing devices connected in parallel, can be simply reduced by varying the length of the waiting time interval between the end of the print event of the first step and the beginning of the print event of the third step, according to a predetermined function.

In the case of a printer device connected in parallel with other devices in a fraudulent way, the synchronization between the control of the drive generating the relative motion between the print head and the image carrier which occurs in the control of the print elements of the print head is inventively made more difficult by the time between the end of the print event in the first step and the beginning of the print even in third step being varied according to the predetermined function. Even if a tamperer could overcome the mechanical impediments and read out the control data for the print elements of the print head on their way to the print head, the invention prevents the appertaining print image from being accurately reproduced at a printer device connected in parallel, since the data for controlling the drive are missing. Such data are far more difficult for a tamperer to obtain, or cannot be obtained at all, since the drive controller and the motor are inaccessibly accommodated in the secure housing part of the postage meter machine.

This print element control data cannot be generated, as a practical matter, by empirical values in an embodiment wherein the predetermined function is selected so that it follows a variation strategy whose pattern repeats, at the earliest, after an adequately large number of variations, for example no earlier than after several hundred or thousands variations. Preferably, the predetermined function is fashioned as a random function. To this end, it can be a type of function referred to as a pseudo-random function, wherein the variation pattern repeats no earlier than after several hundred thousand variations, so that the effect that is necessary to acquire the variation pattern is not rewarding for a tamperer. Further, the predetermined function is preferably a real random function.

If a tamperer nonetheless attempts such a parallel attack, the result that will usually be obtained with a printer device connected parallel is a printout wherein the two partial images are offset relative to one another by a relatively large amount along the first direction. This longitudinal offset usually can be relatively simply detected; if it is large enough it can even be recognized with the naked eye, so that a mailing that is provided with such a franking imprint can be simply separated out upon visual inspection, for example in a mail distribution center. Since franking imprints also frequently contain an indication of the postage meter machine with which they were generated, mailings with counterfeit franking imprints not only can be prevented from being delivered, but also the postage meter machine that was manipulated in order to produce the counterfeit can be identified.

In order to determine the variation of the waiting time interval, one or more predetermined functions can be employed that are based on a predetermined or random strategy. The waiting time interval can change at varying or fixed intervals, for example from print image to print image. The variation proceeds according to a prescribed relationship dependent on the predetermined function or functions.

The waiting time interval need not vary by fixed amounts, but can vary by changing amounts. In other words, the waiting time interval, for example in the case of a variation from print image to print image, can first increase by a first amount, then decrease by three times the first amount, then decrease by twice the first amount, and then increase by half the first amount, etc.

In the simplest case, a predetermined basic interval forms the basis that is then increased and/or decreased by a supplemental interval that is determined based on the predetermined function. The length of the basic interval preferably corresponds to the minimum time that is required in order to reach the position in which printing can be resumed in the third step. In this case, the supplemental interval is then added to the basic interval.

In preferred versions of the inventive method, the variation of the waiting time interval is selected such that, given a control of the relative motion between a second print head (i.e., at a different machine) and a second image carrier without taking this variation of the waiting time interval into consideration, there is adequate probability that a longitudinal offset along the first direction will arise between the first and second partial images that lies in a detectable size range.

In other words, the possibility can be accepted that, using the predetermined function, no variation occurs between one or even a number of successive print images, insofar as it is assured overall that there is an adequately high probability that a sufficiently large, i.e. detectable, longitudinal offset results when the variation is not taken into consideration. An adequately large discontinuity in the waiting time interval that leads to a sufficiently large longitudinal offset must merely occur often enough when the variation is not taken into consideration.

By means of the selected variation of the waiting time interval, the longitudinal offset can be selected so large that it can be detected in an arbitrary way. Preferably, however, the size range of the longitudinal offset is selected such that the longitudinal offset can be detected optically, for example with the image recognition devices as are usually utilized in mail distribution centers. Preferably, the size range of the longitudinal offset is selected such that the longitudinal offset can be recognized with the naked eye, so that the probability of discovering an attempted fraud is further enhanced.

In versions of the inventive method that are preferred because they are simple, the waiting time interval varies in multiples of a variation interval. Then, for example, a number must merely be determined via the predetermined function, and this number is multiplied by the variation interval, and the product is then combined with the aforementioned basic interval according to a predetermined relationship for determining the waiting time interval. The combination, for example, can be formed by adding the product to the aforementioned basic interval in the simplest case.

The size of the of the variation of the waiting time interval, or the length of the variation interval required for a specific longitudinal offset, is defined according to the speed with which the print head and the image carrier move relative to one another. In a version of the inventive method, the variation interval corresponds at least to the quotient of a prescribed longitudinal offset and the average speed of the relative motion between the print head and the image carrier during the third step. It is thus assured that a predetermined minimum longitudinal offset is already achieved given a minimal variation by one time variation interval.

The present invention is also directed to an apparatus for generating a print image, particularly a franking imprint, on an image carrier. In this apparatus, the print image is generated from at least one first partial image and a second partial image arranged offset thereto transversely relative to a first direction. The apparatus has a print head, a drive unit for generating relative motions between the print head and the image carrier, as well as a control device connected to the drive unit and to the print head. The drive unit and the control device are fashioned for generating the first partial image in a first step with a relative motion between the print head and the image carrier along the first direction, for generating a transverse offset between the print head and the image carrier along a second direction proceeding transversely relative to the first direction in a second step, and for generating the second partial image in a third step with a relative motion between the print head and the image carrier along the first direction.

Inventively, the control device has a time control unit for controlling the waiting time interval between the end of the printing event of the first step and the beginning of the printing event of the third step, that generates the waiting time interval with a length that varies according to at least one predetermined function. The effects and advantages described above relating to the inventive method also are achieved with the inventive apparatus.

The predetermined function employed in the apparatus is preferably a pseudo-random function or a random function, as explained above.

In preferred versions of the inventive apparatus, it is provided that the time control unit is fashioned for variation of the waiting time interval such that, if a control of the relative motion between a second print head (at a different device) and a second image carrier is attempted without taking this variation of the waiting time interval into consideration, there is an adequate probability that a longitudinal offset will result along the first direction between the first and second partial image, this longitudinal offset lying in a detectable size range.

For achieving the time control described above in connection with the inventive method, the time control unit in the inventive apparatus can be simply realized with a processing unit, for example a microprocessor, that accesses a program or sub-routine that employs the predetermined function, this program or sub-routine being stored in a memory connected to the processing unit.

DESCRIPTION OF THE PREFERRED EMBODIMENTS

Figure 1:
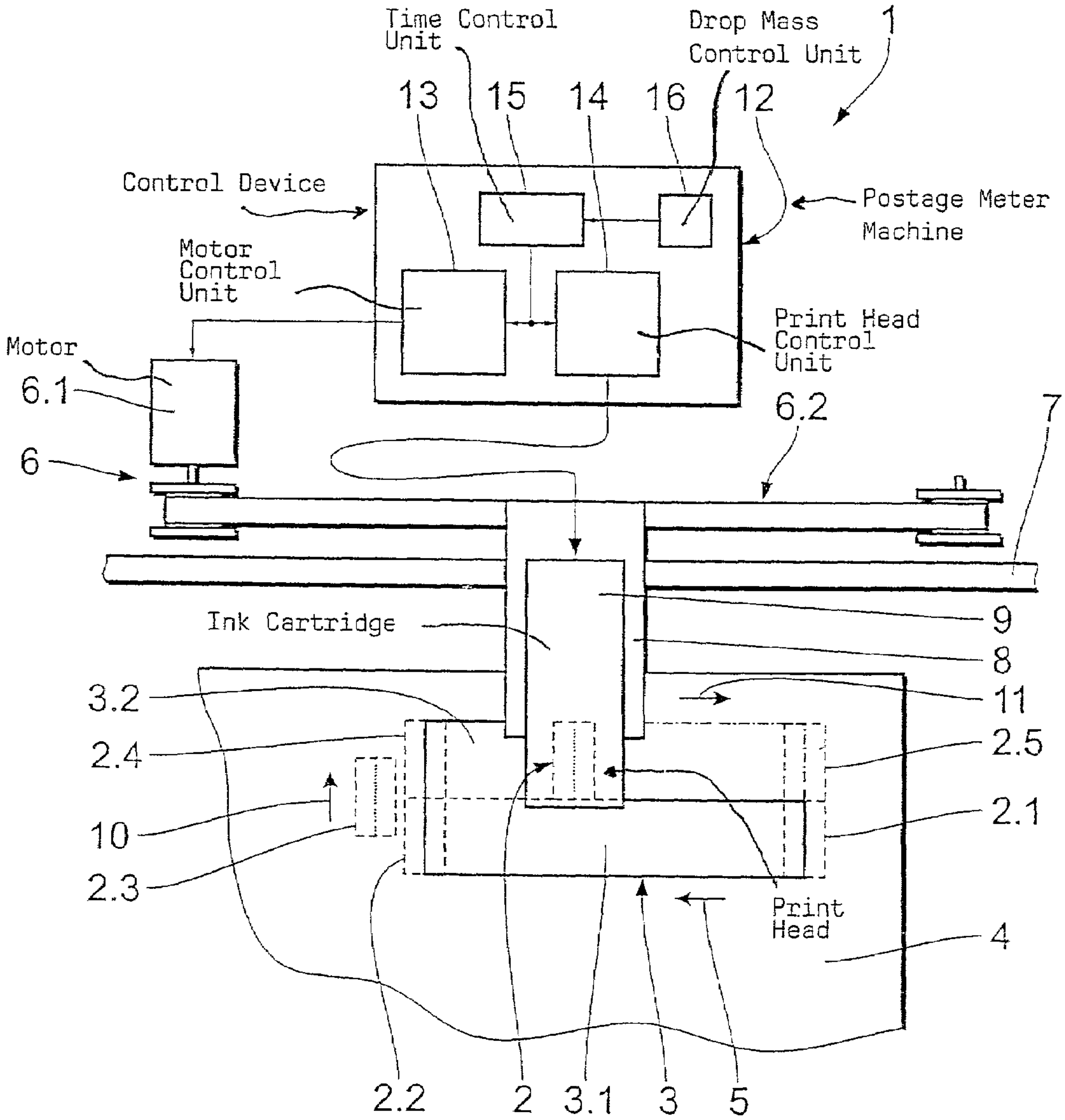
FIG. 1 is a schematic illustration of an inventive apparatus.

FIG. 1 is a schematic illustration of a portion of an inventive apparatus in the form of a postage meter machine 1 having a print head 2 for generating a print image in the form of a franking imprint 3 on a letter for representing an image carrier. The franking imprint 3 is composed of two partial images 3.1 and 3.2 offset transversely relative to a first direction 5, that supplement one another to form the franking imprint 3.

For generating the two partial images 3.1 and 3.2, a first drive unit 6 having a motor 6.1 and a belt 6.2 driven by the motor 6.1 are provided, the belt 6.2 being in turn connected to a mount 8 conducted through a longitudinal guide 7 along the first direction 5. A cartridge 9 with the print head 2 is seated in the mount 8 so as to be displaceable transversely to the first direction 5. The cartridge 9 and thus the print head 2 can thereby be offset transversely to the first direction 5 with a second drive unit (not shown).

The cartridge 9 in the illustrated example is an ink cartridge with integrated ink jet print head 2. However, the invention can be employed in conjunction with print heads that work with other printing principles.

For generating the first partial image 3. 1, the print head 2, proceeding from a first position indicated by the outline 2.1 wherein the printing event begins, is moved in the first direction 5 with respect to the stationary letter 4 into a second position indicated by the outline 2.2 in a first step, the initial printing event ending at the position 2.2. Subsequently, the print head 2 is displaced transversely relative to the first direction 5 in a second direction 10 on the route to a third position indicated by the outline 2.3 in a second step. Subsequently, the print head 2, proceeding from a fourth position indicated by the outline 2.4, wherein the printing event begins again, is moved along the first direction 5 in the direction of the arrow 11 into a fifth position indicated by the outline 2.5 in a third step for generating the second partial image 3.2, the printing event ending at this fifth position.

It is thereby self-evident that only the relative motion between the print head 2 and image carrier is of concern in the invention. Accordingly, the image carrier or the print head 2 and the image carrier can be correspondingly moved in a known way in other versions of the invention.

Figure 2:
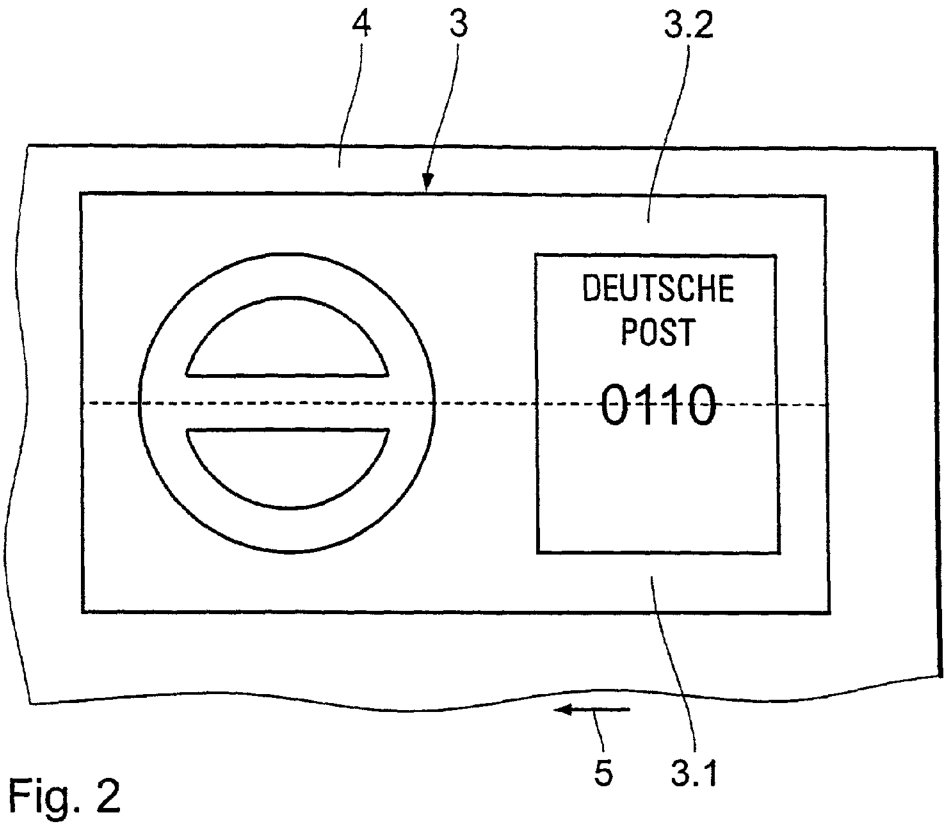
FIG. 2 shows an example of the franking imprint produced by the apparatus of FIG. 1.

In order to obtain two partial images 3.1 and 3.2 that supplement one another to form the franking imprint 3, as can be seen as an example from FIG. 2, a control device 12 connected to the print head 2 and the motor 6.1 in a conventional way is provided, for the synchronized drive of print head 2 and the motor 6.1. Due to this synchronization, no longitudinal offset along the first direction 5 arises between the two partial images 3.1 and 3.2, so that a transition-free franking imprint 3 is printed.

The control device 12 has a motor control unit 13 and a print head control unit 14 as well as a time control unit 15 connected to the motor control unit 13 and the print head control unit 14. This time control unit 15 is fashioned such that it defines information for each print image 3 that determines the waiting time interval that elapses between the end of the printing event of the first step—at position 2.2 of the print head 2—and the beginning of the print event of the third step—at position 2.4 of the print head 2. This information is then forwarded to the motor control unit 13 and to the print head control 14 for synchronization of the drive of print head 2 and motor 6.1.

In the illustrated example, the determination of the waiting time interval ensues for each franking imprint 3 by access to a program that is stored in a memory 16 connected to the time control unit 15. This program employs a predetermined function VF in the form of a pseudo-random function that is configured such that the waiting time interval that is determined has a varying length.

The waiting time interval T is determined from the sum of a predetermined basic interval TG and a supplemental interval TZ according to:

$$T=TG+TZ.$$

The length of the basic interval TG corresponds to the minimum time that is required given the existing drive in order, proceeding from the second position 2.2, to reach the fourth position 2.4 of the print head 2 wherein printing is restarted in the third step.

The supplemental interval TZ is determined by the time control device 15. It is determined as the product of a number F determined upon employment of the predetermined function VF and a predetermined variation interval TV, according to:

$$TZ=F\times TV.$$

The supplemental interval TZ and, thus, the waiting time interval T as well, thus vary by multiples of the variation interval TV.

Figure 3:
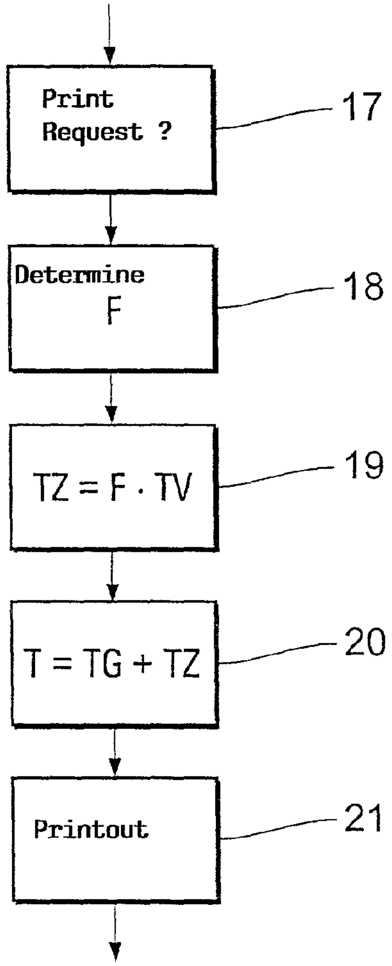
FIG. 3 shows an example of a franking imprint generated if the variation of the waiting time interval is not taken into consideration.

FIG. 3 shows the executive sequence for the determination of the waiting time interval T. First, the presence of a print request is registered in a sequence step 17. In a sequence step 18, the numerical value F is then determined with the predetermined function VF. In sequence step 19, the supplemental interval TZ is then calculated according to the equation above, the waiting time interval T being finally calculated therewith according to the first equation above in sequence step 20. The printout then ensues in sequence step 21.

The predetermined function VF is a known pseudo-random function with which a whole-number random number F from 0 through 10 is calculated given every use. The function VF is thereby selected such that its pattern repeats only after several hundred thousand calculations, so that it is impossible to determine this pattern in a conventional postage meter machine.

Figure 4:
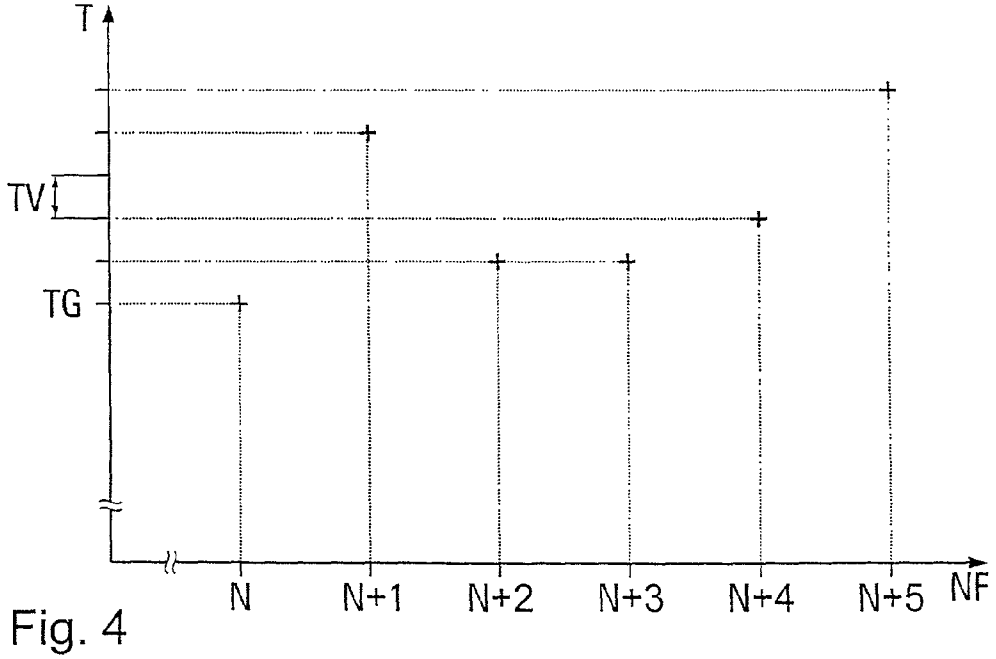
FIG. 4 is a flow chart for the determination of the waiting time interval of the inventive method implemented with the apparatus of FIG. 1.

As an example, FIG. 4 shows an excerpt from a diagram wherein the waiting time intervals P that are employed in the postage meter machine from FIG. 1 are entered over the number NF of the franking. The scaling of the T-axis corresponds to the variation interval TV.

In the franking with the number N, the waiting time interval T(N) corresponds to the basic interval TG. For this franking, consequently, the function VF has supplied the value 0. In the franking with the number N+1, the waiting time interval T(N+1) corresponds to the value TG+4 TV. The function VF, consequently, has supplied the value 4 for this franking. In the frankings with the numbers N+2 and N+3, the waiting time interval T(N+2) and T (N+3) corresponds to the value TG+TV. The function VF for these frankings, consequently, has supplied the value 1. In the franking with the number N+4, the waiting time interval T(N+4) corresponds to the value TG+2TV. The function VF has consequently supplied the value 2 for this franking. In the franking with the number N+5, finally, the waiting time interval (N+5) corresponds to the value TG+3TV. For this franking, consequently, the function VF has supplied the value 3.

It is self-evident that some other way of calculating the waiting time interval can be employed in other versions of the invention in order to achieve the inventive variation. In particular, the described graduation need not ensue in multiples of a variation interval. For example, thus, an appropriately varying number from 1 through 2 can be determined with the predetermined function, this number being multiplied by the basic interval for determining the waiting time interval.

Figure 5:
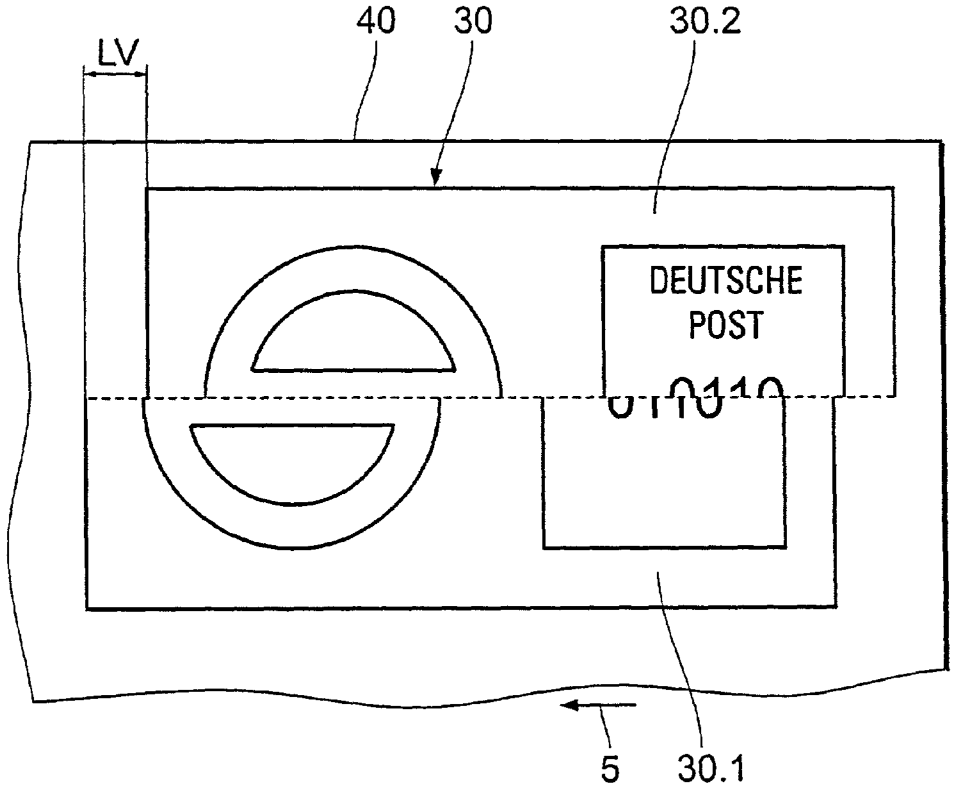
FIG. 5 is a diagram of the waiting time intervals for a number of print images generated with the apparatus of FIG. 1.

FIG. 5 shows an example of an imprint 30 that was generated on a second letter 40 with a second printer device fraudulently connected in parallel to the postage meter machine 1, the second printer device being in the form of a conventional office printer having a second print head (not shown). The control data for the print elements of the print head 2 from FIG. 1 where thereby fraudulently read out on their way to the print head 2 in order to reproduce the franking imprint 3 from FIG. 2.

Due, however, to lack of knowledge, the variation of the waiting time interval key in the drive of the displacement drive for the second print head was not taken into consideration when producing the imprint 30. The information with respect to the time drive of the motor 6.1 is thereby lacking for the drive of the displacement drive for the second print head, since the drive controller 13 and the motor 6.1 are inaccessibly accommodated in the protected housing part of the postage meter machine 1.

Whereas, due to lack of this information in the illustrated example, the second printer device was operated with a waiting time interval corresponding to the basic interval TG, the waiting time interval T employed in the postage meter machine 1 had the value T=TG+2 TV, so that a longitudinal offset LV that is already clearly visible with the naked eye occurs along the first direction 5 between the first partial image 30.1 and the second partial 30.2 of the imprint 30.

Such a clear longitudinal offset can be recognized without difficulty by the image acquisition device as is usually employed in mail distribution centers, so that letters provided with such counterfeited franking inputs 30 can be separated out without further ado.

Since the franking imprints employed also contain an indication of the postage meter machine—not shown in FIGS. 2 through 5—with which they were produced, not only can delivery of pieces of mail with counterfeit franking imprints be presented, but also the postage meter machine which was manipulated to produce the counterfeits.

In order to achieve the longitudinal offset shown in FIG. 5, the length of the variation interval TV in the postage meter machine 1 from FIG. 1 is determined from the quotient of a predetermined longitudinal offset LVV per variation interval and the average speed VM of the print head 2 during the third step, according to:

$$TV=LVV/VM.$$

It is thus assured that, even given a minimal deviation in the drive of the displacement drive for the second print head by one time the variation numeral TV, a predetermined minimal longitudinal offset LVV is achieved. In the example shown in FIG. 5, the longitudinal offset amounts to twice the minimum longitudinal offset LVV.

As a numerical example, the minimum longitudinal offset LVV can be 1.25 mm, which leads to a variation interval of 10 ms according to the equation immediately above, given an average print head speed of 125 mm/s.

Although the invention has been described above with reference to print images composed of two partial images, it is self-evident that the invention can also be applied without difficulty in conjunction with the generation of print images having more than two partial images. Moreover, variation need occur in all waiting time intervals; it can also suffice that only one waiting time interval has a varied length. It can likewise be provided to change the time interval or time intervals that vary. Although the invention was described above in conjunction with postage meter machines, it can also be employed in conjunction with other printer devices wherein similar demands exist for the suppression of attempted fraud.

Although modifications and changes may be suggested by those skilled in the art, it is the intention of the inventors to embody within the patent warranted hereon all changes and modifications as reasonably and properly come within the scope of their contribution to the art.

I claim as my invention:

1. A method for generating a print image on an image carrier composed of a first partial image and a second partial image disposed transversely offset relative to a first direction, comprising the steps of:

(a) generating a relative motion between an ink droplet-ejecting printhead and said image carrier along said first direction for generating said first partial image on said image carrier;

(b) generating a transverse offset between said printhead and said image carrier in a second direction proceeding transversely to said first direction;

(c) generating a relative motion between said printhead and said image carrier along said first direction for generating said second partial image on said image carrier; and (d) repeating steps (a), (b) and (c) while varying a waiting time interval between an end of printing in step (a) and a beginning of printing in step (c), according to a prescribed function that varies said waiting time interval in multiples of a variation interval equal to a quotient of a prescribed longitudinal offset and an average speed of the relative motion between the printhead and the image carrier in step (c).

2. A method as claimed in claim 1 wherein step (d) comprises varying said waiting time interval so that a relative motion according to steps (a), (b) and (c) between said printhead and said image carrier, without taking the variation of said waiting time interval into account, may cause a longitudinal offset along said first direction between said first partial image and said second partial image on said image carrier which is of a detectable size.

3. A method as claimed in claim 2 wherein said detectable size is an optically detectable size.

4. A method as claimed in claim 3 wherein said optically detectable size is detectable with the naked eye.

5. A method as claimed in claim 1 wherein said prescribed function varies said waiting time interval in said multiples of said variation interval from print image-to-print image.

6. An apparatus for generating a print image on an image carrier composed of a first partial image and a second partial image disposed transversely offset relative to a first direction, comprising:

an ink drop-ejecting printhead;

a printhead positioner connected to said printhead for generating a relative motion between an ink drop-ejecting printhead and said image carrier in a first step along said first direction for generating said first partial image on said image carrier, generating a transverse offset between said printhead and said image carrier in a second step in a second direction proceeding transversely to said first direction, and generating a relative motion between said printhead and said image carrier in a third step along said first direction for generating said second partial image on said image carrier, said transverse offset in said second step producing an overlap region between said first partial image and said second partial image on said image carrier, said printhead in each of said first and third steps, ejecting a plurality of ink drops, including first ink drops, from said printhead onto said image carrier in said overlap region; and a time control unit connected to said printhead that repeats said first, second and third steps while varying a waiting time interval between an end of printing in said first step and a beginning of printing in said third step, according to a prescribed function that varies said waiting time interval in multiples of a variation interval equal to a quotient of a prescribed longitudinal offset and an average speed of the relative motion between the printhead and the image carrier in said third step.

7. An apparatus as claimed in claim 6 wherein said time control unit varies said waiting time interval so that a relative motion according to said first, second and third steps between said printhead and said image carrier, without taking the variation of said waiting time interval into account, may cause a longitudinal offset along said first direction between said first partial image and said second partial image on said image carrier which is of a detectable size.

8. An apparatus as claimed in claim 7 wherein said detectable size is an optically detectable size.

9. An apparatus as claimed in claim 8 wherein said optically detectable size is detectable with the naked eye.

10. An apparatus as claimed in claim 6 wherein said control unit employs a prescribed function that varies said waiting time interval in said multiples of said variation interval from print image-to-print image.

* * * * *